ARLEY C. BLUHM
ELMO F. BLUHM INVENTORS

BY John D. Gassett
ATTORNEY

United States Patent Office

3,201,060
Patented Aug. 17, 1965

3,201,060
DISPENSING REEL
Arley C. Bluhm, 4400 W. Cliff Ave., Denver 19, Colo., and Elmo F. Bluhm, 350 Saulsbury St., Denver 26, Colo.
Filed Jan. 25, 1963, Ser. No. 253,928
3 Claims. (Cl. 242—110.3)

This invention relates to a reel for dispensing cable. An object of the invention is to provide a reel for dispensing cable without any entangling or kinking. It is another object to make available to electricians a light weight portable dispenser reel which is easily loaded and which can be easily adjustable to accommodate different gage cable.

Figure 1:
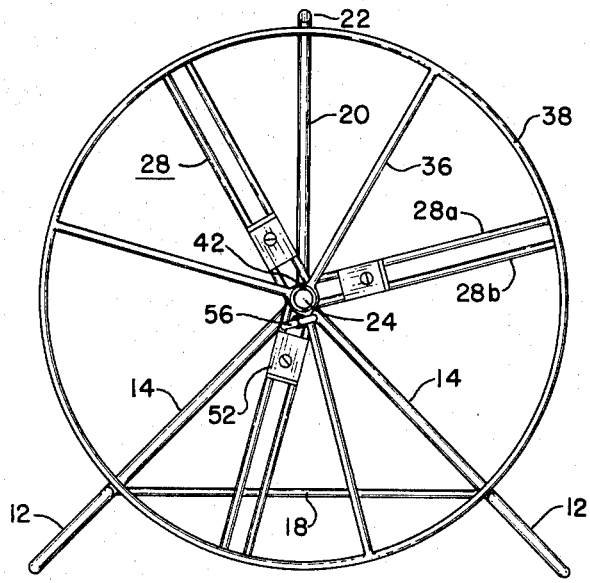
Figure 2:
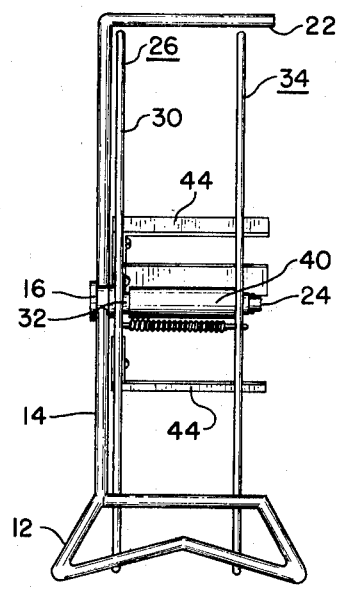
Figure 3:
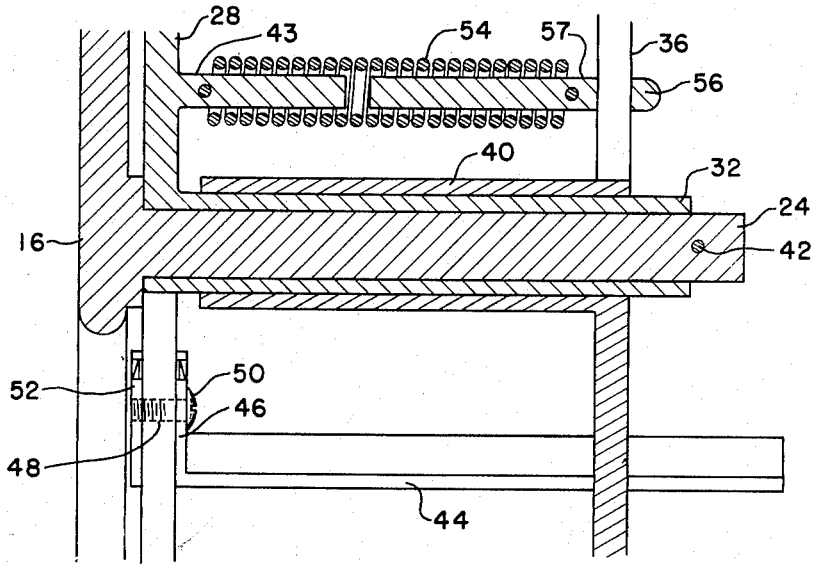

Other objects and a better understanding of the invention may be had from the following description taken in conjunction with the drawing in which FIG. 1 illustrates an elevation view of the apparatus;
FIG. 2 illustrates an end view of the device; and
FIG. 3 illustrates a cross section of the hub portion of the device.

Turning now to the drawing there is illustrated a frame. The frame includes a base portion having two spaced apart base sections 12. Extension members 14 extend upwardly from base sections 12 to a hub member 16. The two base sections or members 12 are connected by transverse connecting bar 18.

Extending upwardly from hub 16 is a stabilizing means 20 which has a horizontal extension 22 which serves as a handle and also serves to stabilize the cable which may be wound on the spool as will be seen. The frame then is seen to include spaced apart base sections 12, connecting rod 18, base extension members 14, hub 16, and upright member 20 and its horizontal extension 22. It has been found desirable to make these members, excluding the hub member 16, of ⅜ to ½ inch mild steel which is heated and bent to shape. Connecting rod 18 can be made of a smaller dimension rod, say ¼ inch, and of mild steel.

Extending horizontally from hub member 16 is axle member 24. Rotatably mounted on axle member 24 is first or interior element 26 having radial spokes 28 and rim 30. This wheel has a hub element 32 which rotatably fits over axle 24.

Spaced along axle 32 from hub member 16 is a second or exterior wheel 34 which has radial spokes 36 and rim 38. Spokes 36 are welded or otherwise connected to an axle element 40 which is slidably and rotatably mounted upon axle member 32 of the other wheel 26. If hub element 40 rotates with hub 32 it is not particularly objectionable; however, hub element 40 must be freely slidable with respect to hub element 32. An axle pin 42 is mounted to axle 24 to hold axle element 32 in place.

Wheel 26 is similar to 34; the primary difference being that wheel 26 has double spokes 28 which includes rods 28a and 28b which are spaced apart. This is to accommodate the adjustment of the adjustable reel support or bracket member 44. There is an adjustable support or bracket member 44 for each spoke 28a and 28b. There are three such support brackets shown; however, the exact number is not critical. These 3 support brackets 44 form a spool hub upon which the electric cable to be dispensed is mounted.

The adjustable support bracket 44 has an end member 46 at the end thereof. Member 46 has a hole 48 through which a clamping screw 50 is extended. On the opposite side of spoke 28 is a clamping plate 52. Plate 52 is tapped to threadedly receive screw 50. Attachable resilient means are provided for urging the exterior wheel 34 toward the interior wheel 26. This includes a spring member 54 which is attached to interior wheel 26 at spokes 28 at a position radially interior of bracket member 44. That is, it is toward the center of the wheel. The spring is shown attached to and surrounding an extension rod 43 which can be made integral with spoke 28. The other end of spring 54 has a fastening means such as hook 56. The spring partially surrounds and is attached to extension rod 57 which is shown as an integral part of hook 56. Hook 56 is fastened to spoke 36 of exterior wheel 34 and urges the exterior wheel 34 inwardly toward interior wheel 26.

Having described the physical nature of the apparatus, your attention will now be directed toward its operation. The reel is designed for dispensing non-metallic sheathed electric cable, flexible conduit, building wire, extension cords, etc. Different gage cable comes in different size rolls, that is, the cable comes wound like a cowboy's lariat and is contained in a box. It normally has no spool upon which it is wound, but rather is in a circular coil wound within the box. The diameter or size of the interior of the coil varies for different size cables. Thus support brackets 44 are adjusted along spokes 28 so that the support brackets are spaced to accommodate the particular cable which is to be dispensed. This is easily done by loosening screws 50, sliding the brackets to the correct position and retightening screws 50. Spring 54 is then detached from spoke 36 of wheel 34. Wheel 34 is then readily removed. At this time the roll of cable to be dispensed is placed upon support brackets 44. The hub element 40 of exterior wheel 34 is then placed upon hub element 32 of the interior wheel. At this time spring 54 which is already fastened at one end to the interior wheel 26 is fastened at the other end by hook member 56 to the exterior wheel. The cable is then dispensed as desired. As the cable is dispensed or rolled off, the spring assembly decreases the width of the spool and maintains alignment of cable on the spool and prevents entanglement.

While the preferred embodiment of the invention has been illustrated and described above it is to be understood that the invention is capable of various modifications without departing from the scope of the invention. It is therefore desired that the scope of the invention be defined by the following claims.

What is claimed is:

1. A dispenser for an electrical cable which comprises: an interior wheel member having an axle member; an exterior wheel having a second axle member, said first axle member and said second axle member being mounted in a telescoping relationship; cable support brackets mounted from said interior wheel; means for adjusting the radial position of each said support bracket; a frame member; a third axle member supported from said frame member, said first axle member and said second axle member being rotatably mounted with respect to said third axle member; resilient means connecting said exterior wheel and said interior wheel in a manner to urge them together, said resilient means being between said support brackets and the axle members of said wheel members.

2. A reel for dispensing electric cable which comprises; a first base member; a second base member; a rod connecting said first base member and said second base member in a fixed spaced apart relationship; an axle member supported from said base members; an interior wheel having an elongated hub member which is rotatably mounted on said axle member, said interior wheel having at least three pair of spokes extending outwardly from said hub member, the spokes of each pair being spaced one from the other, a support bracket for each said pair of spokes, said support bracket having clamping means to firmly clamp said pair of spokes, each said clamping means being adjustable radially along its pair of spokes; a second wheel having at least three spokes and a second hub member which is rotatably mounted about said first hub member; resilient means connecting said wheels and urging them together; a bar member extending upwardly from and perpendicular to said axle member, said bar member having a horizontal bar member extending over said exterior wheel in the direction of said exterior wheel and essentially parallel to said axle member.

3. A dispenser reel for cable which comprises: a first base member; a second base member; a transverse rod connecting said first base member and said second base member; an axle member supported from said base members in a horizontal position; a first elongated hub member rotatably mounted on said axle member; a first set of spoke elements extending radially from said first elongated hub member; a second elongated hub member, said second hub member and said first hub member longitudinally slidably mounted with respect to each other; a second set of spoke elements extending radially from said second elongated hub; a plurality of support brackets; radially adjustable means for securing said brackets horizontally from one set of spoke elements at selected radial positions; and means urging one set of spoke elements toward the other set.

References Cited by the Examiner

UNITED STATES PATENTS

| | | | |
|---|---|---|---|
| 1,451,131 | 4/23 | Weber | 242—115 |
| 2,144,094 | 1/39 | Wood | 242—85 X |
| 2,229,796 | 1/41 | Carlson | 242—110.1 |
| 2,370,868 | 3/45 | Luebke | 242—100.2 |
| 2,406,435 | 8/46 | Payne | 242—118.5 |
| 2,707,599 | 5/55 | Snyder | 242—110.3 |

FOREIGN PATENTS 54,318   1/38   Denmark.

MERVIN STEIN, *Primary Examiner.*